(12) United States Patent
Kummamuru et al.

(10) Patent No.: US 7,912,714 B2
(45) Date of Patent: Mar. 22, 2011

(54) METHOD FOR SEGMENTING COMMUNICATION TRANSCRIPTS USING UNSUPERVISED AND SEMI-SUPERVISED TECHNIQUES

(75) Inventors: Krishna Kummamuru, Hyderabad (IN); Deepak S. Padmanaban, Kerala (IN); Shourya Roy, New Delhi (IN); L. Venkata Subramaniam, Haryana (IN)

(73) Assignee: Nuance Communications, Inc., Burlington, MA (US)

( * ) Notice: Subject to any disclaimer, the term of this patent is extended or adjusted under 35 U.S.C. 154(b) by 337 days.

(21) Appl. No.: 12/060,469

(22) Filed: Apr. 1, 2008

(65) Prior Publication Data

US 2009/0112571 A1  Apr. 30, 2009

Related U.S. Application Data

(63) Continuation of application No. 11/931,806, filed on Oct. 31, 2007.

(51) Int. Cl.
*G10L 15/06* (2006.01)
(52) U.S. Cl. .............................. 704/245; 704/4; 704/10
(58) Field of Classification Search .................. 704/245, 704/255, 257, 1, 2, 3, 4, 7, 9, 10, 239, 243, 704/244, 256
See application file for complete search history.

(56) References Cited

U.S. PATENT DOCUMENTS

| | | | |
|---|---|---|---|
| 6,839,671 B2 * | 1/2005 | Attwater et al. | ............. 704/255 |
| 6,928,407 B2 | 8/2005 | Ponceleon et al. | |
| 2005/0044487 A1 | 2/2005 | Bellegarda et al. | |
| 2006/0224584 A1 | 10/2006 | Price | |

OTHER PUBLICATIONS

Stolcke, A. and Shriberg, E., "Automatic Linguistic Segmentation of Conversational Speech", In Proceedings of the International Conference on Spoken Language Processing, 1996, vol. 2, pp. 1005-1008, Philadelphia, PA.

Wesenick, M.-B., and Kipp, A., "Estimating the Quality of Phonetic Transcriptions and Segmentations of Speech Signals", In Proceedings of the International Conference on Spoken Language Processing, 1996, pp. 129-132, Philadelphia, PA.

Mishne, G., Carmel, D., Roytman, A., and Soffer, A., "Automatic Analysis of Call-Ceter Conversations", In Proceedings of the 14th ACM International Conference on Information and Knowledge Management, Oct. 2005, pp. 453-459, Bremen, Germany.

Park, A. and Glass, J.R., "Towards Unsupervised Pattern Discovery in Speech", In Proceedings of the IEEE Workshop on Automatic Speech Recognition and Understanding, 2005, pp. 53-58, San Juan, Puerto Rico.

* cited by examiner

*Primary Examiner* — Huyen X. Vo
(74) *Attorney, Agent, or Firm* — Wolf, Greenfield & Sacks, P.C.

(57) ABSTRACT

A method is provided for forming discrete segment clusters of one or more sequential sentences from a corpus of communication transcripts of transactional communications that comprises dividing the communication transcripts of the corpus into a first set of sentences spoken by a caller and a second set of sentences spoken by a responder; generating a set of sentence clusters by grouping the first and second sets of sentences according to a measure of lexical similarity using an unsupervised partitional clustering method; generating a collection of sequences of sentence types by assigning a distinct sentence type to each sentence cluster and representing each sentence of each communication transcript of the corpus with the sentence type assigned to the sentence cluster into which the sentence is grouped; and generating a specified number of discrete segment clusters by successively merging sentence clusters according to a proximity-based measure between the sentence types assigned to the sentence clusters within sequences of the collection.

15 Claims, 3 Drawing Sheets

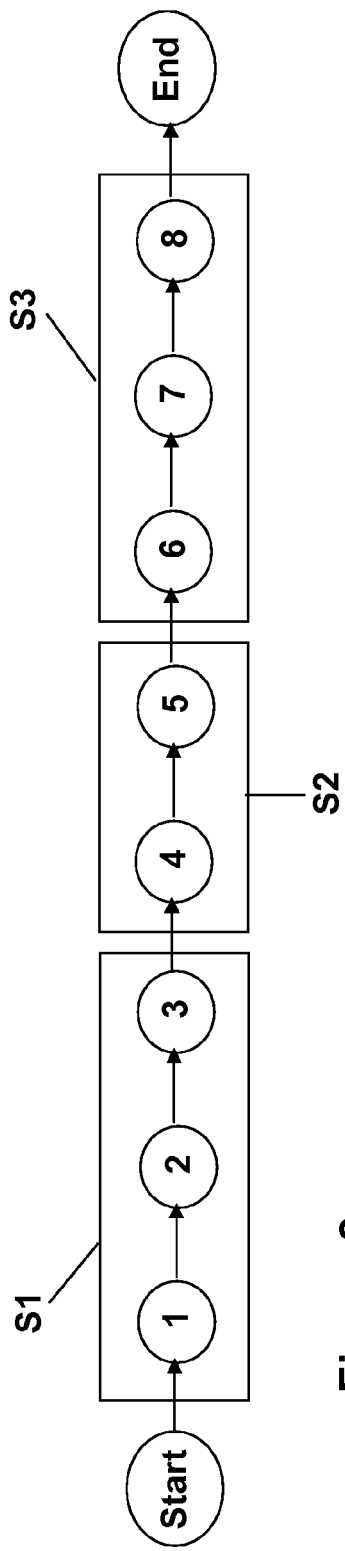

Figure 2 details: "date and time", "on what date", "what date and", "at what time", "from which location", "around what time", "what date", "date and", "and time", "which location", "what time", "on what", "like to pick", "to pick up", "a car", "to pick", "i want to", "you like to", "time", "would you like";

rates: "includes all the", "for the whole", "includes all", "unlimited", "with all the", "all the taxes", "with all", "including all the", "all taxes and", "charges", "the taxes", "the taxes and", "all taxes", "unlimited miles", "with unlimited", "taxes and", "surcharges";

Figure 3

METHOD FOR SEGMENTING COMMUNICATION TRANSCRIPTS USING UNSUPERVISED AND SEMI-SUPERVISED TECHNIQUES

CROSS-REFERENCE TO RELATED APPLICATION

This application is a continuation of U.S. patent application Ser. No. 11/931,806, filed Oct. 31, 2007, the disclosure of which is incorporated by reference herein in its entirety.

BACKGROUND OF THE INVENTION

1. Field of the Invention

Exemplary embodiments of the present invention relate to segmentation of communication transcripts, and more particularly, to unsupervised and semi-supervised techniques for segmenting communication transcripts.

2. Description of Background

Call centers are centralized offices that are used for the purpose of receiving and transmitting a large volume of requests through communication channels such as telephone calls, emails, and instant messages. Many organizations operate call centers that provide dialog-based support from specialized agents to sell their products, handle customer issues, and address product-related and services-related issues. With the operational cost of call centers becoming essentially equal among competitors, the primary differentiator between competitors is quality of service. Thus, there is an increasing need for tools that are able to automatically analyze quality of service.

A typical call center agent handles tens to hundreds of calls and other communications per day depending on the complexity of the issues addressed. With the advances in speech recognition technologies for converting speech signals to a sequence of words in digital text and their widespread deployment in call centers, huge volumes of data are produced everyday in the form of transcripts of call conversations or communications from telephone calls, emails, instant messages, and the like. Call centers constantly monitor these communication transcripts to improve agent productivity, study cross-sell and up-sell opportunities, check compliance, analyze how customers perceive their offerings, etc. In most cases, only a small, sample number of the communications are manually analyzed for monitoring purposes mainly because of the infeasibility of manually analyzing all the communications, and further, because the analysis done for one objective differs from that for other objectives.

In typical call center communications, agents and customers take turns speaking to each other to complete transactions such as, for example, making car rental reservations. While handling such transactional communications, agents attempt to follow a well-defined communication or call flow that specifies how an agent should proceed in a communication, address the needs of customers, handle objections, persuade customers, follow compliance issues, etc. Thus, there are many communications in which customers express similar needs that agents are trained to address in the same prescribed manner. While the words exchanged during these communications may not match verbatim, due to, for example, differences in the particular phrases used or the sequence of questions and answers, each communication can be expected to enter a certain set of states and complete a sequence of events within each of these states before moving on to the next state. As a result, it becomes possible to partition a communication into segments of contiguous sentences based upon the particular action that is performed in each state of the communication. A segment in a communication therefore refers to a state, or a section of dialogue, during which the caller and the recipient or responder interact on a specific topic/task.

Automatically identifying these lexical segments in communications has many potential applications in call or communication analysis and agent monitoring. Using segmentation, agent monitoring procedures can be highly automated and non-compliance can be detected. Segmentation can be helpful in determining whether the prescribed communication flow is being followed by agents, whether the prescribed tasks are being properly performed in each state, and whether prescribed tasks are taking more time than expected. For example, in a typical car rental reservation transaction, an agent is instructed to verify the details of the reservation before confirming, and it becomes possible to automatically check compliance with this particular guideline only when the segments in the communications have been explicitly identified.

When call center communications that are guided by a well-defined communication flow are examined in their entirety, it can be difficult to identify differences between the communications. By performing segmentation of a communication transcript, the communication can be broken into parts to help call or communication monitoring by highlighting these differences, and it becomes feasible to examine whether the agent handled different aspects correctly. For example, simply by looking at the presence or absence of segments, it can be easily determined whether the agents are following the prescribed communication flow, which can facilitate comparison between agents. Segmentation can also be employed by a call center to determine what agents are doing well in key segments so that all the agents can be trained to follow these positive traits. Apart from facilitating monitoring of communications, the logical break up of communications into segments can also allow for a call center to determine the efficiency of the prescribed communication flow and make an assessment of whether any changes should be made. Furthermore, segmentation can allow for more efficient information extraction, which is of interest to the text mining community.

Accordingly, it is desirable to provide a mechanism for explicitly finding states or segments in the communication flow from the transcripts of call center communications that can help in monitoring communications, improve agent productivity, and track compliance to guidelines.

SUMMARY OF THE INVENTION

The shortcomings of the prior art can be overcome and additional advantages can be provided through exemplary embodiments of the present invention that are related to a method for forming discrete segment clusters of one or more sequential sentences from a corpus of communication transcripts of transactional communications in which each communication transcript includes a sequence of sentences spoken between a caller and a responder. The method comprises dividing the communication transcripts of the corpus into a first set of sentences spoken by the caller and a second set of sentences spoken by the responder; generating a set of sentence clusters by grouping the first and second sets of sentences according to a measure of lexical similarity using an unsupervised partitional clustering method; generating a collection of sequences of sentence types by assigning a distinct sentence type to each sentence cluster and representing each sentence of each communication transcript of the corpus with the sentence type assigned to the sentence cluster into which the sentence is grouped; and generating a specified number of discrete segment clusters of one or more sequential sentences by successively merging sentence clusters according to a proximity-based measure between the sentence types assigned to the sentence clusters within sequences of the collection.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to provide for automatic, unsupervised segmentation of communication transcripts. Exemplary embodiments can be implemented to utilize lexical coherence, textual proximity, and position information within each segment in a manner that is tolerant to noise in the transcripts and noise introduced by multiple levels of clustering.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIG. 2 is a graphical representation of an example of a segmented transactional communication transcript.

FIG. 3 is a depiction of exemplary collections of characteristic phrases obtained from a contact center for the example segment types "details" and "rates".

Figure 1:
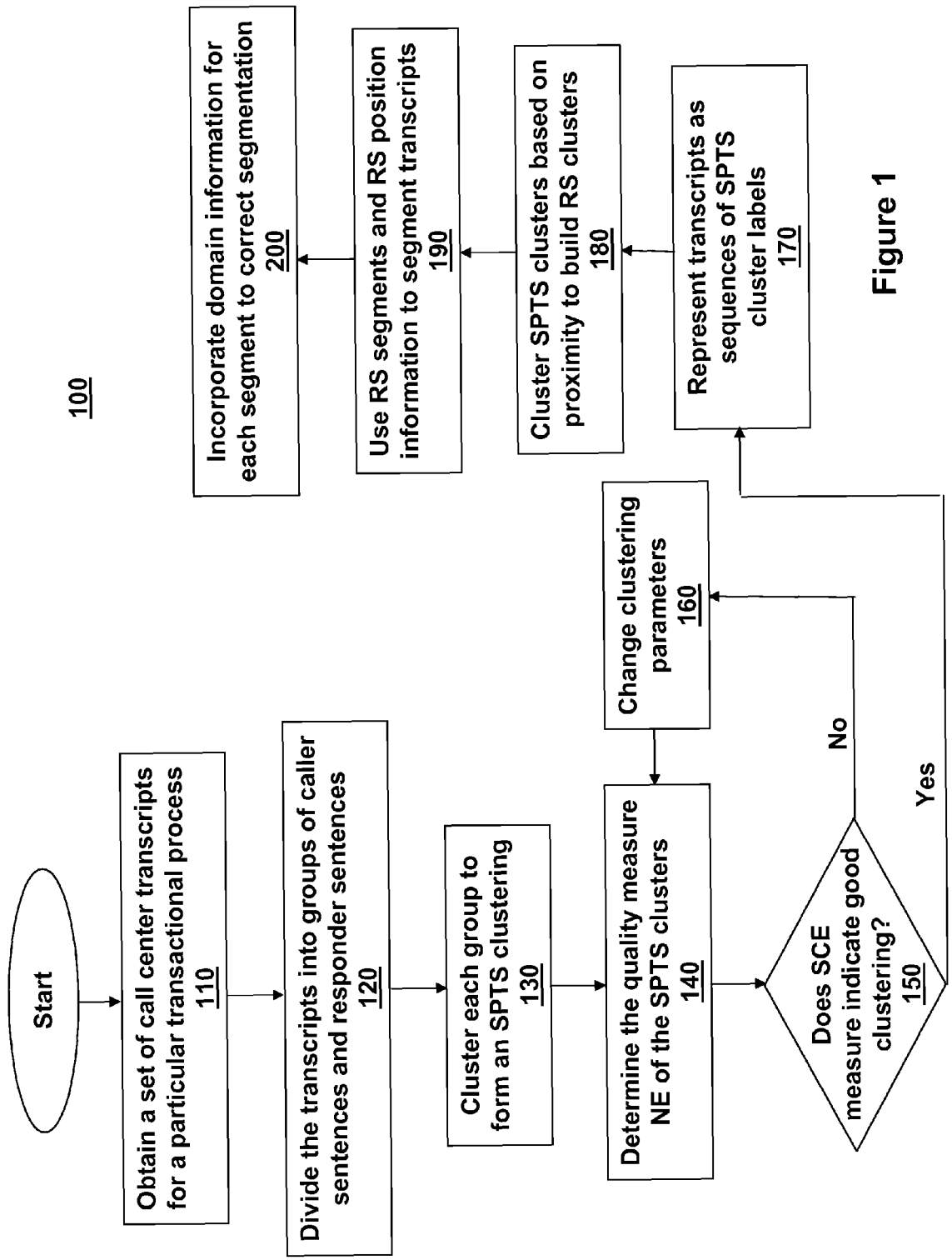
FIG. 1 is a flow diagram illustrating an exemplary embodiment of a process of segmenting a communication transcript of a transactional communication in accordance with the present invention.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention are directed to mechanisms for automating analysis of call center communications by segmenting transcripts of the exchanges. Exemplary embodiments employ a method of identifying segments (or states) that is unsupervised (that is, a set of training data consisting of labeled examples or categories of segments is not available at the outset; rather, the segments form a model that is fit to a gathered collections of communication transcripts) and embodies various subtasks of the underlying call or communication flow in communication transcript data to thereby divide communications based upon these segments. Exemplary embodiments are also directed to mechanisms for improving segmentation mechanisms by using a type of semi-supervision to provide for improvements in accuracy. Exemplary embodiments are also directed to mechanisms for automatically checking the compliance of agents that can be implemented to improve the precision of identifying compliance. Exemplary embodiments can be implemented to exploit multiple transcripts of essentially similar exchanges and to perform analysis of the transcripts of communications that have been obtained either manually (for example, directly through instant messaging applications used to provide dialog-based support) or by using speech recognition systems.

Exemplary embodiments of the present invention can be implemented to generally perform a two-level analysis by considering communications as sequences of information exchanges between the caller and the agent responder. The first level involves assessing logical units of information exchange, referred to herein as sub-procedure text segments (SPTSs), in individual communications by analyzing communication transcripts in isolation to identify distinct transactional interactions in the communications based on lexical similarity and an entropy measure. The second level builds on the first by assessing sequences of SPTSs in multiple communications using a corpus or database of transcripts to identify similar groups of interactions (segments) in the communications. Exemplary embodiments can also be implemented to perform an algorithm that utilizes limited or semi-supervision data in the form of frequent phrases for finding segments.

Exemplary embodiments can be implemented to provide a mechanism for analyzing sequences of SPTSs to automatically segment an individual communication transcript by utilizing the average positioning information of segments across communications in either an unsupervised or semi-supervised manner. In exemplary embodiments in which communications are segmented in an unsupervised manner, SPTSs are grouped together to form Representative Segments (RSs). As described above, a segment in a communication refers to a collection of consecutive dialogue that is related to a specific task or subject. Therefore, RSs can be identified from the collection of SPTS sequences such that the SPTSs representing an RS tend to appear together in communications across the corpus of communication transcripts. Once RSs have been identified, they can be utilized to perform segmentation of a communication transcript by grouping the SPTSs of the communication according their proximity to RSs.

Referring now to FIG. 1, a flow diagram illustrating an exemplary embodiment of a process 100 of segmenting a communication transcript in accordance with the present invention is illustrated. In exemplary process 100, at block 110, a set of communication transcripts from a particular transactional call center process is obtained, for example, from a corpus of communication transcripts. At block 120, the communication transcripts are divided into two groups of sentences—one corresponding to the sentences spoken by callers and the other the sentences spoken by the agent receiving or responding to the communication. Because collections of communication transcripts are typically very diverse in the kind of problems that they address, these two groups of sentences are then clustered according to a specified number of topic clusters that address a specific issue at block 130 to form clusters of SPTSs.

More specifically, in the present exemplary embodiment, to form SPTS clusters, the collected communication transcripts in the corpus are segmented in an unsupervised manner. By representing the collection of communications obtained at block 110 by $\{C_1, \ldots, C_N\}$, each communication C can be represented by a sequence of exchanges $\{v_1(C), \ldots, v_{|C|}(C)\}$, where $|C|$ is the number of exchanges in the communication. At block 120, each exchange v in the communication sequence can be divided into a sentence $v^1$ spoken by an caller followed by a sentence $v^2$ spoken by a person responding to the caller. The length of the communication $C_i$ is represented by $n_i$, where $|C_i|=n_i/2$ for $i=1, \ldots, N$.

To segment the collection of communications, an unsupervised partitional clustering process is performed that creates topic clusters of sentences such that the sentences inside a cluster are close to each other in terms of lexical similarity and also far apart from sentences in other topic clusters. In exemplary embodiments, to work with a set of similar communications, the collection of communication can be clustered into K topic clusters at block 130 using a K-means algorithm (KMA). The general steps performed in the K-means clustering are as follows: (1) choose the number of topic clusters K; (2) randomly generate K clusters and determine the centroid for each cluster; (3) assign each sentence to the nearest cluster centroid; (4) re-compute the nearest cluster centroid; and (5) repeat the previous steps until a specified convergence criterion is met.

In exemplary embodiments, if the corpus contains only communications on the same topic (that is, the case in which K=1), this initial phase of clustering can be skipped. By letting $T_1, \ldots, T_K$ be a partition of the collection of communications into K topic clusters, $$G_i = \bigcup_{\forall t, C_j \in T_i} v_t^1(C_j)$$

be the set of sentences spoken by the callers in the communications in $T_i$, and $$H_i = \bigcup_{\forall t, C_j \in T_i} v_t^2(C_j)$$

be the set of sentences spoken by responders to the callers in $T_i$, $G_i$s and $H_i$s can be clustered separately to obtain SPTSs using the KMA. The set of SPTSs clusters can then be denoted by $S=\{S_1, \ldots, S_M\}$, and each communication $C_i$ in the collection of communication as $\{C_1, \ldots, C_N\}$ can be represented by a sequence of SPTS $S_j$s.

In the present exemplary embodiment, the KMA clustering is performed adaptively until a good quality set of SPTSs is obtained, and the number of clusters in the good quality set is determined by optimizing a quality measure called the SPTS-Cluster-Entropy (SCE) measure. A typical communication consists of a sequence of information exchanges, and assuming that there exist some sentences in a communication that reflect sub-procedures steps, the goodness of the SPTS clusters can be partially judged by the frequency of communications that contain sentences from each SPTS cluster and the number of communications into which the sentences in each SPTS cluster are scattered. Thus, the SCE measure is defined in terms of the scatter of the communications in the corpus across the set of SPTS clusters. More specifically, a given clustering of SPTSs is considered to be good if many communications in the corpus are scattered across many clusters in the set of SPTSs.

Before assessing the quality measure for a given clustering, a normalized entropy (NE) measure is first determined with respect to each communication in the corpus at block 140. The NE of a communication C with respect to the set of SPTS clusters is defined as $$NE_S(C) = -\left(\sum_i d_i \log(d_i)\right) \Big/ \log(n),$$

where $d_i$ is the fraction of communication C in cluster $$S_i, \quad E_S(C) = -\sum_i d_i \log(d_i)$$

is the entropy of communication C, and n is the length of communication C. Because $\log(|C|)$ is the maximum value that entropy can assume, each NE quality measure would assume a value between 0 and 1.

As an example, where a communication $C_1$ is provided that is represented by the sequence of SPTSs $(S_2, S_1, S_5, S_6, S_4)$ and a communication $C_2$ is provided that is represented by the sequence of SPTSs $(S_3, S_5, S_5, S_3, S_5)$, it is obvious from the representation that $C_1$ is more scattered than $C_2$. The entropy of $d_i$, as provided by $E_S(C)=-\Sigma_i d_i \log(d_i)$, captures this scatter. More specifically, when the set of SPTS clusters $S=\{S_1, \ldots, S_6\}$, $E_S(C_1)=0.6989$, and $E_S(C_2)=0.29$. The entropy measure also works well to compare the communications of the same cardinality. As another example, a communication $C_3$ that can be represented by the sequence of SPTSs $(S_1, S_2)$ and a communication $C_4$ that can be represented by the sequence of SPTSs $(S_1, S_1, S_1, S_1, S_2, S_2, S_2, S_2)$ possess the same entropy. Intuitively, the entropy measure for communication $C_3$ should be higher than that of communication $C_4$ because $C_3$ is already scattered across as many clusters as possible. Accordingly, the NE of communication $C_3$ has a calculated value of 1.0 and the NE of communication $C_4$ has a calculated value of 0.333.

In the present exemplary embodiment, the NE values for a collection of communications can be used to define the SCE measures for the sets of SPTSs, which measure the quality for each step-level cluster that is generated during clustering at block 130. By representing each communication $C_i$ in the corpus as the sequence of SPTS clusters $\{s_{i1}, \ldots, s_{in_i}\}$, where $s_{ij} \in S$, the SCE measure of a set of SPTS clusters S with respect to the corpus of communication transcripts is defined as $$SCE_{Corpus}(S) = \left( \frac{\sum_{i=1}^{N} n_i NE_S(C_i)}{\sum_i n_i} \right).$$

That is, the SCE measure is calculated as the cardinality-weighted average of NE values of the communication in the corpus. The SCE measure increases with the number of clusters because there are more clusters into which a given communication may be scattered. Moreover, for a given number of clusters and an approximately equal number of data elements, the SCE measure decreases as the average communication length increases. This is due to the increased probability of two steps in the same communication being mapped into the same cluster as the length of a communication increases. Both the clusters and the corpus parameterize the SCE measure.

In the present exemplary embodiment, at decision block 150, a determination is made as to whether a given clustering S is good by assessing the SCE measure. A clustering is said to be good if many communications in the corpus are scattered across many clusters in S. More particularly, a good clustering is one with a very good NE value and a high number of sentences per cluster. If the given clustering S is deemed to be good, the process proceeds to block 170, at which each communication $C_i$ in the collection of communications will then be represented in the corpus as a sequence of SPTS cluster labels $\{s_{i1}, \ldots, s_{in_i}\}$ corresponding to the sentences of the communication $C_i$. The cluster labels can be used for characterizing the clusters to make the output more readable. These characteristic labels can be obtained using, for example, text summarization algorithms to obtain descriptive and/or discriminative words. If the given clustering set is not deemed to be good, the process proceeds to block 160, at which the KMA clustering parameters are changed. In exemplary embodiments, the first parameter that can be changed is the random seed for the KMA, and the second parameter change can involve an increase in the number of topic clusters K. After changing the parameters, the process returns to block 130, at which a new set of SPTS clusters are formed based the new parameters to segment the collection of communications in the corpus in an unsupervised manner.

In the present exemplary embodiment, at block 180, the topic SPTS clusters are further clustered according to their proximity in the corpus of communications to build RS clusters. To perform the clustering at block 180, a proximity-based similarity measure between SPTS clusters that is proportional to the frequency of their co-occurrence in a certain neighborhood of the communications in the corpus is used in a relational-clustering algorithm to partition the SPTS clusters into a given number of RS clusters. As a result, SPTSs that occur in close proximity are clustered together in a RS, and each RS cluster is considered to represent a segment in a communication. It can be seen that the similarity depends on the corpus and changes with the corpus.

In exemplary embodiments, the similarity measure used at block 180 can be defined in the following manner: (1) Let $X_{ij}$ represent the number of times SPTSs $S_i$ and $S_j$ occurred in the corpus of communications within a neighborhood of $\omega$; that is, $X_{ij} = |\{(k,l,m): s_{kl} = S_i, s_{km} = S_j, |l-m| < \omega\}|$; (2) let $\Phi = \max_{ij} X_{ij}$; (3) then, the similarity between SPTSs $S_i$ and $S_j$ is defined as $$\varphi(S_i, S_j) = \frac{X_{ij}}{\Phi}.$$

In exemplary embodiments, agglomerative hierarchical clustering (AHC) can be performed to successively merge the most-similar separate SPTSs into larger clusters using the similarity measure as defined above until a desired number of segment clusters is reached. The resulting clusters can be denoted by $\Sigma_1, \ldots \Sigma_L$. That is, $\Sigma_i \subseteq S$ and $\Sigma_i \cap \Sigma_j = \{\ \}$, $\forall i \neq j$.

In exemplary embodiments, once the RS clusters have been formed, the corpus of RSs can be utilized to segment communication transcripts by converting each communication to a sequence of SPTSs, which entails assigning each sentence in the communication to the nearest SPTS to obtain a sequence of SPTSs representing the communication, and then mapping the resulting sequence of SPTSs for the communication to the corresponding RS clusters. Segmentation is the process of dividing a communication into sequences of consecutive segments where each segment is composed of one or more sequential sentences. A graphical representation of an example of a segmented transactional communication transcript is illustrated in FIG. 2. In this example, the communication contains eight sentences and each sentence is mapped to some SPTS, $S_i$, which is in turn part of some RS, $R_j$. The segments of the example communication are divided into three blocks in FIG. 2. The first three sentences form a first segment S1, the next two form a second segment S2, and the remaining three sentences belong to a third segment S3.

In the exemplary embodiment depicted in FIG. 1, at block 190, the corpus of RSs, along with the positioning information of the RS clusters, is utilized to segment communication transcripts in a noise-tolerant fashion. More specifically, for a given communication transcript C of length n to be segmented, communication C is first converted into a sequence of SPTSs by assigning each sentence in the communication to an SPTS whose centroid is closest to the sentence. Then, the resulting SPTSs in the sequence are mapped to corresponding RSs, such that the sequence of SPTSs of communication C can be denoted as $\{s_i, \ldots, s_n\}$ and the corresponding sequence of RSs can be denoted as $\{r_i, \ldots, r_n\}$. That is, $r_i \in \{\Sigma_1, \ldots \Sigma_L\}$, $\forall_i$. A segmentation J of communication C can be represented as a sequence of numbers $(j_1, \ldots, j_d)$, where the first $j_1$ sentences of communication C belong to the first segment, the next $j_2$ sentences belong to the next segment, and so on. It should be noted that $\Sigma_k j_k = n$, which corresponds to the length of communication C.

Following this conversion, the average relative communication positions of each $\Sigma_i$ can be used to estimate the authenticity of each sentence in communication C to enable robust segmentation. The communication position of an occurrence of a segment within communication C is measured as the fraction of the communication that has elapsed before this occurrence. More specifically, for a communication C of length n and an RS occurrence $\Sigma$ that occurs at a position j in the communication sequence, the relative position of the RS occurrence is j/n, and the average relative position of occurrence of RS clusters $\Sigma$ in a corpus, denoted by AV($\Sigma$), is the average of the relative positions of each occurrence of the RSs in the corpus.

Intuitively, it can be expected that that the occurrence of an RS at a position very distant from the position at which it typically occurs in a communication is likely to be a noisy occurrence. In the present exemplary embodiment, in a communication of length n, the probability of the jth RS, $r_j$, being a non-noisy occurrence can be expressed as $PN(r_j)=1-|j/n-AV(rj)|$. The probability of non-noise as thus defined is able to capture the relationship between communication position and noise by assigning a weight that is inversely related to its distance from the usual occurrence position to each RS occurrence in the communication. The weight that is assigned using this probability of non-noise is linear with respect to the distance of an occurrence from the average relative position. In alternative exemplary embodiments, other probability calculations can be utilized for expressing the probability of non-noise, such as, for example, those that depend on the position of the neighboring average relative positions.

A purity measure can generally be interpreted as reflecting classification accuracy under the assumption that all objects of a cluster are classified to be members of the dominant class for that cluster. In the present exemplary embodiment, the purity of a segment is defined as being high if all probabilities $r_i$ occur with a high probability of non-noise and belong to the same cluster $\Sigma$. The purity of a segment $J_{kl}=(r_k, \ldots, r_{k+1})$ in a communication C can be given by $$\text{Purity}(J_{kl}) = \frac{1}{\sum_{i=k}^{k+1} PN(r_i)} \max_{p} \sum_{i=k, r_i=\Sigma_p}^{k+1} PN(r_i).$$

Using this purity calculation, the communication C can be segmented into a sequence of segments $j_1, \ldots, j_d$ such that the purity of each segment is greater than a threshold value $\mu$, where $(0.0 \leq \mu \leq 1.0)$.

In the present exemplary embodiment, the communication segmentation performed at block 190 in FIG. 1 is achieved using a variant of agglomerative hierarchical clustering. This AHC variant begins by assigning each sentence to its own segment that is labeled with the RS identifier of the sentence. Then, these segments are merged in a robust fashion by an iterative process involving the following sequence of steps: (1) merge contiguous sequences of segments that have the same segment label to form a single segment; (2) find the pair of adjacent segments $(S_i, S_j)$ for which their merger results in a segment of maximal purity; and (3) if the merger of $S_i$ and $S_j$ results in a segment of purity of less than $\mu$, stop the agglomerative process and output the current segmentation. If instead the merger of $S_i$ and $S_j$ results in a segment of purity that is not less than $\mu$, the segments are merged and assigned to the label of the RS having the maximal concentration on the merged segment, and the iterative process repeats.

As an example, a communication $C_1$ having 20 sentences that can be represented by the RS Sequence $(\Sigma_2, \Sigma_2, \Sigma_2, \Sigma_2, \Sigma_3, \Sigma_2, \Sigma_2, \Sigma_4, \Sigma_4, \Sigma_4, \Sigma_4, \ldots)$ is provided. The AV values for $\Sigma_2$ and $\Sigma_3$ are 0.05 and 0.9 respectively, and the fifth sentence is transcribed as "agent: thank you for calling XYZ". In this example, the fifth sentence is a noisy occurrence of a "sign-off message" in which the agent mistakenly assumes that he has completed the transaction. The probabilities of non-noise for the corresponding sentences can be calculated to be (1.0, 0.95, 0.90, 0.85, 0.35, 0.75, . . . ), while the probability of non-noise corresponding to the fifth sentence is found to be 0.35, as this occurrence is more distinguishable in the communication from typical occurrences of similar sentences. By specifying a value for $\mu$ of 0.95 in the present example, $(\Sigma_2, \Sigma_2, \Sigma_2, \Sigma_2)$ would be assigned as the first segment and, because the addition of $\Sigma_3$ to the first segment would bring the purity of the first segment to below 0.95, $(\Sigma_3)$ would be assigned as the second segment (that is, $j_1=4$ and $j_2=1$). Alternatively, by specifying a value for $\mu$ of 0.90, $(\Sigma_2, \Sigma_2, \Sigma_2, \Sigma_2, \Sigma_3, \Sigma_2, \Sigma_2)$ would be assigned as the first segment, which, by canceling out the effect of the noisy fifth sentence, provides a more intuitive segmentation. The foregoing example illustrates how the robustness to noise in segmenting communications can be induced both by the assignment of non-noise probabilities and by using a reasonable value for $\mu$.

In the exemplary embodiment provided in FIG. 1, at block 200, semi-supervision techniques are utilized to provide for better segmentation by incorporating domain information for each segment into the segmentation process. Domain information can be procured as a collection of characteristic phrases for each pre-defined segment type. The use of characteristic phrases for each segment type provides for the ability to be reused across processes for those segment types that are common across processes. Many segment types such as, for example, "greeting", "gathering personal details", and "conclusion" tend to be common across very diverse processes, and it is easy to remove very specialized phrases from phrase collections without domain knowledge to ensure generality of the technique that uses them. For example, a greeting segment typically will contain a phrase such as "how may I", "may I assist", etc., and a details segment typically will contain a phrase such as "date and time", "on what date", etc. Examples of collections of characteristic phrases obtained from a contact center for the exemplary segment types "details" and "rates" are provided in FIG. 3. In exemplary embodiments, each automatic segment can be mapped to predefined segments using these words or phrases.

In exemplary embodiments, characteristic phrase collections such as those illustrated in FIG. 3 can be utilized to repair the set of RSs before the sequence is used to perform automatic segmentation. In performing this RS repair phase, by letting $A=\{A_1, \ldots, A_M\}$ denote the sets of phrases obtained from domain experts such that each $A_i$ corresponds to a pre-defined segment type $G_i$, the correspondence between an RS $\Sigma_i$ and a pre-defined segment type $G_j$ can be measured using $\text{Score}(\Sigma_i, G_j)$, which is defined as the total number occurrences of phrases in the set $A_j$ among the sentences in $\Sigma_i$. The Score measurements can then be used to modify the collection of RS $\Sigma$s to arrive at a new collection of RS $\Sigma$s by performing the following operations. First, for an RS $\Sigma_i$, if the majority of occurrences of phrases are from the set of phrases $A_j$, RS $\Sigma_i$ is assigned to $G_j$. Otherwise, if there is no such pre-defined segment type, $\Sigma_i$ is excluded from the set of RSs. Then, if multiple $\Sigma$s get assigned to the same $G_j$, the multiple $\Sigma$s are merged to form a single merged RS.

The operations described above for using the Score measurements to modify the collection of RS $\Sigma$s cannot have the effect of increasing the number of RSs, but may decrease the number of RSs by deletion or merger. The usage of domain knowledge in this fashion seeks to arrive at a set of RSs that has a one-to-one mapping to the set of pre-defined segments. The first step, which is performed to delete RSs that are not matched to a single pre-defined segment, helps to remove noisy RSs that may pollute the segmentation. Noisy RSs may be the result of, for example, noisy sentences in the communication, noise induced while obtaining the SPTS clusters, and/or noise in the clustering of SPTS clusters to form RSs. The second step, which is performed to merge RSs, performs the repair to remove any many-to-one mappings that may exist between RSs and pre-defined segments. Therefore, in the presence of domain knowledge, the first step operates to generate a larger number of RSs than the number of pre-defined segments, which helps to avoid any one-to-many mapping between the RSs and pre-defined segments. The many-to-one mappings introduced due to the larger number of RSs would then be removed by the second, repairing step.

In exemplary embodiments in which supervision techniques are employed are described above to provide for better segmentation, the operations performed rely on supervisory phrases and have little tolerance to noise in the phrases. In exemplary embodiments, this can be addressed by assigning fuzzy membership values to the phrases in $A_i$ that can be used to compute the function Score(., .).

Exemplary embodiments of the present invention can be implemented to improve the precision of performing automatic compliance checking of communications handled by agents who are trained to follow a prescribed communication flow by using the segmented transcripts of the communications. Compliance checking involves verifying that an agent has performed all the mandatory checks that are prescribed by the contact center process guidelines. One method of automatically checking compliance is to determine whether predefined phrases relating to the guidelines are present in the communication transcripts. For example, to check if the agent has confirmed that the customer has a valid driver license, a search of the transcript for key words such as "driver license", "valid", etc., can be performed. Key words that are used for such a mandatory confirmation, however, may also occur in various other contexts in a communication, and only those instances that occur as part of the mandatory confirmation are relevant to compliance checking. As a result, it may not be possible to accurately determine if the agent has performed a particular key task by looking at the entire communication. To isolate the specific relevant instances, it can be checked whether the predefined phrases are present in appropriate, relevant segment(s) of a communication after segmentation has first been applied to the communication transcript. Using segmentation in this manner, it becomes possible to conduct a search for the corresponding key words only in the particular segments in which the key task is supposed to be present according to the prescribed communication flow. Thus, in exemplary embodiments, the use of segmentation in performing compliance checking can be used to reduce the number of false positives (that is, instances where the key words that are characteristic of a mandatory check occur in other, irrelevant segments) and therefore provide for more precise compliance checking of the same task than when compliance checking is performed on raw communication transcripts.

The capabilities of exemplary embodiments of present invention described above can be implemented in software, firmware, hardware, or some combination thereof, and may be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general-purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

Figure 4:
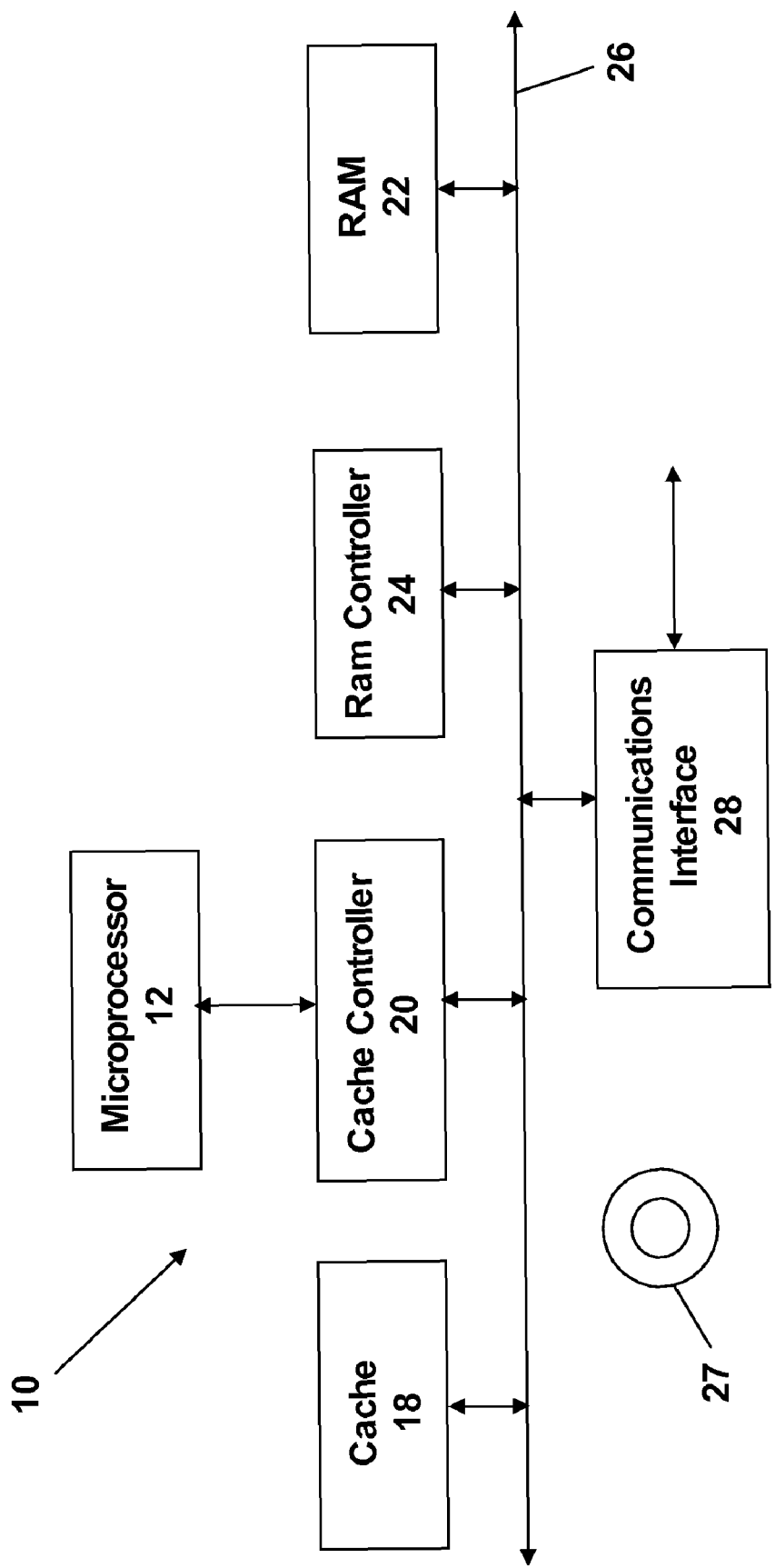
FIG. 4 is a block diagram illustrating an exemplary hardware configuration or a computer system within which exemplary embodiments of the present invention can be implemented.

For instance, exemplary embodiments of the present invention can be implemented within the exemplary embodiment of a hardware configuration provided for a computer system in FIG. 4. FIG. 4 illustrates an exemplary computer system 10 upon which exemplary embodiments of the present invention can be implemented. A processor or CPU 12 receives data and instructions for operating upon from on-board cache memory or further cache memory 18, possibly through the mediation of a cache controller 20, which can in turn receives such data from system read/write memory ("RAM") 22 through a RAM controller 24, or from various peripheral devices through a system bus 26. The data and instruction contents of RAM 22 will ordinarily have been loaded from peripheral devices such as a system disk 27. Alternative sources include communications interface 28, which can receive instructions and data from other computer systems.

The above-described program or modules implementing exemplary embodiments of the present invention can work on processor 12 and the like to perform shape interpolation. The program or modules implementing exemplary embodiments may be stored in an external storage medium. In addition to system disk 27, an optical recording medium such as a DVD and a PD, a magneto-optical recording medium such as a MD, a tape medium, a semiconductor memory such as an IC card, and the like may be used as the storage medium. Moreover, the program may be provided to computer system 10 through the network by using, as the recording medium, a storage device such as a hard disk or a RAM, which is provided in a server system connected to a dedicated communication network or the Internet.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for forming discrete segment clusters of one or more sequential sentences from a corpus of communication transcripts of transactional communications, each communication transcript including a sequence of sentences spoken between a caller and a responder, the method comprising:

dividing the communication transcripts of the corpus into a first set of sentences spoken by the caller and a second set of sentences spoken by the responder;

using a processor, generating a set of sentence clusters by grouping the first and second sets of sentences according to a measure of lexical similarity using an unsupervised partitional clustering method;

generating a collection of sequences of sentence types by assigning a distinct sentence type to each sentence cluster and representing each sentence of each communication transcript of the corpus with the sentence type assigned to the sentence cluster into which the sentence is grouped; and generating a specified number of discrete segment clusters of one or more sequential sentences by successively merging sentence clusters according to a proximity-based measure between the sentence types assigned to the sentence clusters within sequences of the collection.

2. The method of claim 1, wherein the unsupervised partitional clustering method is a K-means algorithm that is performed adaptively by increasing the specified number of sentence clusters until a quality measure is optimized.

3. The method of claim 2, wherein the quality measure is calculated by first determining a normalized entropy value for each communication transcript in the corpus with respect to the set of sentence clusters, and then determining a cardinality-weighted average of the normalized entropy values for every communication transcript in the corpus with respect to the set of sentence clusters.

4. The method of claim 1, wherein the proximity-based measure between any pair of sentence clusters is proportional to a frequency of co-occurrence of the pair of sentence types assigned to the pair of sentence clusters in a certain neighborhood of the sequences of sentence types in the collection.

5. The method of claim 4, wherein the specified number of discrete segment clusters is generated using an agglomerative hierarchical clustering method to successively merge pairs of sentence clusters having the highest proximity measure between them into larger sentence clusters until the specified number of discrete segment clusters is reached.

6. The method of claim 1, further comprising correcting the discrete segment clusters using semi-supervision by incorporating a distinct predetermined collection of key phrases for each of one or more segment types.

7. The method of claim 6, wherein correcting the discrete segment clusters using semi-supervision comprises assigning each discrete segment cluster of the specified number of discrete segment clusters for which most of the one or more sequential sentences of the discrete segment cluster are within the collection of key phrases for one segment type of the one or more segment types to the segment type, removing each discrete segment cluster from the specified number of discrete segment clusters for which most of the one or more sequential sentences of the discrete segment cluster are not within the collection of key phrases for any of the one or more segment types, and merging discrete segment clusters that are assigned to the same segment type of the one or more segment types.

8. The method of claim 7, wherein fuzzy membership values are used for the key phrases of the distinct predetermined collection of key phrases for each of one or more segment types when correcting the discrete segment clusters using semi-supervision.

9. The method of claim 1, further comprising segmenting a given communication transcript of a transactional communication into discrete segments of one or more sequential sentences by generating a sequence of sentence types by representing each sentence of the given communication transcript with the sentence type assigned to the sentence cluster having a centroid that is closest to the sentence, and segmenting the given communication transcript into discrete segments of one or more sequential sentences by mapping the sequence of sentence types to the corresponding discrete segment clusters of the specified number of discrete segment clusters.

10. The method of claim 9, wherein segmenting the given communication transcript into discrete segments is performed by assigning to each sentence of the given communication transcript a segment label that corresponds to the discrete segment cluster into which the sentence type assigned to the sentence is grouped, and then using an agglomerative hierarchical clustering method comprising:

merging sequential sentences of the given communication transcript to which the same segment label has been assigned to form a sequence of discrete sentence segments; and successively merging the pair of adjacent sentence segments in the sequence of discrete sentence segments for which the merger forms a sentence segment having a maximum purity value among sentence segments that would be formed by mergers of every pair of adjacent sentence segments in the sequence of discrete sentence segments until the maximum purity value is less than a specified threshold.

11. The method of claim 10, wherein the purity value of a sentence segment is determined based upon a probability of the sentence segment being a non-noisy occurrence.

12. The method of claim 11, wherein the probability of the sentence segment being a non-noisy occurrence is based upon an average relative communication position of each segment cluster corresponding to a segment label that has been assigned to a sentence of the sentence segment.

13. A computer-usable memory device having computer readable instructions stored thereon for execution by a processor to perform a method for segmenting a given communication transcript of a transactional communication into discrete segments of one or more sequential sentences, the call transcript including a sequence of sentences spoken between a caller and a responder, the method comprising:

dividing the communication transcripts of a corpus of communication transcripts of transactional communication into a first set of sentences spoken by the caller and a second set of sentences spoken by the responder;

generating a set of sentence clusters by grouping the first and second sets of sentences according to a measure of lexical similarity using an unsupervised partitional clustering method;

generating a collection of sequences of sentence types by assigning a distinct sentence type to each sentence cluster and representing each sentence of each communication transcript of the corpus with the sentence type assigned to the sentence cluster into which the sentence is grouped;

generating a specified number of discrete segment clusters of one or more sequential sentences by successively merging sentence clusters according to a proximity-based measure between the sentence types assigned to the sentence clusters within sequences of the collection;

generating a sequence of sentence types corresponding to the given communication transcript by representing each sentence of the given communication transcript with the sentence type assigned to the sentence cluster having a centroid that is closest to the sentence; and identifying discrete segments of one or more sequential sentences in the given communication transcript by mapping the sequence of sentence types to the corresponding clusters of discrete segments of one or more sequential sentences.

14. A data processing system comprising:

a central processing unit;

a memory for storing data and programs for execution by the central processing unit; and computer readable instructions stored in the random access memory for execution by the central processing unit to perform a method for segmenting a given communication transcript of a transactional communication into discrete segments of one or more sequential sentences, the communication transcript including a sequence of sentences spoken between a caller and a responder, the method comprising:

dividing the communication transcripts of a corpus of communication transcripts of transactional communications into a first set of sentences spoken by the caller and a second set of sentences spoken by the responder;

generating a set of sentence clusters by grouping the first and second sets of sentences according to a measure of lexical similarity using an unsupervised partitional clustering method;

generating a collection of sequences of sentence types by assigning a distinct sentence type to each sentence cluster and representing each sentence of each communication transcript of the corpus with the sentence type assigned to the sentence cluster into which the sentence is grouped;

generating a specified number of discrete segment clusters of one or more sequential sentences by successively merging sentence clusters according to a proximity-based measure between the sentence types assigned to the sentence clusters within sequences of the collection;

generating a sequence of sentence types corresponding to the given communication transcript by representing each sentence of the given communication transcript with the sentence type assigned to the sentence cluster having a centroid that is closest to the sentence; and identifying discrete segments of one or more sequential sentences in the given communication transcript by mapping the sequence of sentence types to the corresponding clusters of discrete segments of one or more sequential sentences.

15. A method for forming discrete segment clusters of one or more sequential sentences from a corpus of communication transcripts of transactional communications, each communication transcript including a sequence of sentences spoken between a caller and a responder, the method comprising:

dividing the communication transcripts of the corpus into a first set of sentences spoken by the caller and a second set of sentences spoken by the responder;

using a processor, grouping the first and second sets of sentences into a set of sentence clusters using a K-means algorithm that is performed adaptively until a quality measure is optimized, the quality measure being calculated by first determining a normalized entropy value for each communication transcript in the corpus with respect to the set of sentence clusters, and then determining a cardinality-weighted average of the normalized entropy values for every communication transcript in the corpus with respect to the set of sentence clusters;

assigning a distinct sentence type to each sentence cluster of the set of sentence clusters;

representing each sentence of each communication transcript of the corpus with the sentence type assigned to the sentence cluster into which the sentence is grouped to generate a collection of sequences of sentence types;

performing agglomerative hierarchical clustering to successively merge pairs of sentence clusters according to a proximity-based measure between pairs of sentence clusters to generate a specified number of discrete segment clusters of one or more sequential sentences, the proximity-based measure between any pair of sentence clusters being proportional to a frequency of co-occurrence of the pair of sentence types assigned to the pair of sentence clusters in a certain neighborhood of the sequences of sentence types in the collection;

obtaining a distinct predetermined collection of key phrases for each of one or more segment types;

assigning each discrete segment cluster of the specified number of discrete segment clusters for which most of the one or more sequential sentences of the discrete segment cluster are within the collection of key phrases for one segment type of the one or more segment types to the segment type;

removing each discrete segment cluster from the specified number of discrete segment clusters for which most of the one or more sequential sentences of the discrete segment cluster are not within the collection of key phrases for any of the one or more segment types; and merging any discrete segment clusters of the specified number of discrete segment clusters that are assigned to the same segment type of the one or more segment types.

* * * * *

UNITED STATES PATENT AND TRADEMARK OFFICE
CERTIFICATE OF CORRECTION

| | |
|---|---|
| PATENT NO. | : 7,912,714 B2 |
| APPLICATION NO. | : 12/060469 |
| DATED | : March 22, 2011 |
| INVENTOR(S) | : Kummamuru et al. |

It is certified that error appears in the above-identified patent and that said Letters Patent is hereby corrected as shown below:

ON THE COVER PAGE, item (75), the last name of inventor Deepak S. Padmanaban should read --Padmanabhan--.

Signed and Sealed this
Thirty-first Day of May, 2011

David J. Kappos
*Director of the United States Patent and Trademark Office*